(12) United States Patent
Prewitt

(10) Patent No.: US 6,421,525 B1
(45) Date of Patent: Jul. 16, 2002

(54) ENHANCED LEARNING AID

(76) Inventor: Arthur C. Prewitt, 6945 Wade Rd., Tucson, AZ (US) 85743

(*) Notice: Subject to any disclaimer, the term of this patent is extended or adjusted under 35 U.S.C. 154(b) by 0 days.

(21) Appl. No.: 09/496,733

(22) Filed: Feb. 2, 2000

Related U.S. Application Data

(60) Provisional application No. 60/118,468, filed on Feb. 3, 1999.

(51) Int. Cl.[7] ................................ G09B 3/00
(52) U.S. Cl. .................. 434/350; 434/307 R; 434/362; 463/42; 709/204
(58) Field of Search .................. 434/118, 156, 434/169, 218, 219, 236, 307 R–308, 322–324, 335, 336, 350, 362, 365; 463/30, 32, 40, 42; 273/DIG. 17; 472/59, 60, 70, 130; 345/8; 376/216; 370/490; 705/1, 26, 50, 74, 77; 706/915, 927; 709/203–205, 219, 231; 713/170; 725/74, 82, 85, 114, 131

(56) References Cited

U.S. PATENT DOCUMENTS

| | | | | |
|---|---|---|---|---|
| 5,002,491 A | * | 3/1991 | Abrahamson et al. | 434/322 |
| 5,295,836 A | * | 3/1994 | Ryu et al. | 434/335 |
| 5,306,154 A | * | 4/1994 | Ujita et al. | 434/218 |
| 5,318,450 A | * | 6/1994 | Carver | 434/336 |
| 5,662,523 A | * | 9/1997 | Yasumura et al. | 463/30 |
| 5,697,844 A | * | 12/1997 | Von Kohorn | 463/40 |
| 5,862,223 A | * | 1/1999 | Walker et al. | 705/50 |
| 5,879,165 A | * | 3/1999 | Brunkow et al. | 434/322 |
| 5,957,699 A | * | 9/1999 | Peterson et al. | 434/350 |
| 5,974,446 A | * | 10/1999 | Sonnenreich et al. | 709/204 |
| 6,024,577 A | * | 2/2000 | Wadahama et al. | 434/322 |
| 6,091,930 A | * | 7/2000 | Mortimer et al. | 434/362 |
| 6,141,528 A | * | 10/2000 | Remschel | 434/350 |
| 6,155,840 A | * | 12/2000 | Sallette | 434/323 |
| 6,157,808 A | * | 12/2000 | Hollingsworth | 434/350 |
| 6,162,060 A | * | 12/2000 | Richard et al. | 434/118 |

* cited by examiner

Primary Examiner—Joe H. Cheng
(74) Attorney, Agent, or Firm—Gavin J. Milczarek-Desai; Durando Birdwell & Janke, P.L.C.

(57) ABSTRACT

A learning aid which is mounted within a bus. A central computer stores lessons and distributes selected lessons to student work stations which are positioned for individual passengers. Each student work station includes a display unit and an input apparatus (such as a keyboard). The local computer at the student work station is in communications with the central computer. The preferred communication channel is through the use of radio frequencies. Scores for the passengers are collected and recorded in some embodiments for use by the instructor.

18 Claims, 6 Drawing Sheets

ENHANCED LEARNING AID

BACKGROUND OF THE INVENTION

Priority for this application is claimed from U.S. Provisional Patent Application Ser. No. 60/118,468, filed on Feb. 3, 1999, and entitled, "Enhanced Learning Aid".

This invention relates generally to education and more particularly to education during bus trips.

In almost all rural settings, and in many cities, the task of getting to school can take from a half-hour to a full hour. This time is usually wasted, being spent on either sleep, attempting to perform the homework from the day before, or "horsing around" with the other passengers. To a very large extent, the time spent on the bus in transit from home to school and back each day is wasted.

To compound the lost opportunity, often the passengers within the school bus are the same age and often attend the same class since elementary schools typically adjourn earlier than secondary schools, which adjourn earlier than high school.

The present invention creates a system which assists in creating a learning environment for the school bus so that this time is fruitfully used.

SUMMARY OF THE INVENTION

The present invention establishes a computer system which is usable within a school bus setting. The computer system is programmed to create a variety of learning environments and to readily teach skills commensurate with the age of the passengers.

The learning aid of this embodiment is mounted within a bus. This entire system is powered by the power system of the bus.

A central computer, ideally located near the bus driver, stores lessons and distributes selected lessons to student work stations which are positioned for individual passengers. The lesson presented to the student is commensurate with the student's skills.

Each student work station includes a display unit (such as Liquid Crystal Display, LCD) and an input apparatus (such as a keyboard).

The local computer at the student work station is in communications with the central computer. The preferred communication channel is through the use of radio frequencies.

In some embodiments, scores for the students are collected and recorded (either through a print-out or on removable non-volatile memory, i.e. a disc) for use by the instructor.

Other embodiments of the invention include cameras at each student work station allowing the bus driver to monitor the students through individual cameras.

In an alternative embodiment of the invention, central screens communicate a single lesson to all of the students on the bus. This embodiment is very useful as a method to augment the lessons from the classroom or for review prior to class.

The system provides both visual and aural information to facilitate learning in the school bus environment. The display and audio systems are controlled via a computer. The computer sequentially displays information along with the associated audio controlled by a software program. The material presented and the method of presentation is based on sound educational principles. The program content is easily changed to provide an endless variety of lessons.

In one embodiment of the invention, the subject matter to be taught is selected by the student. In this way, a student is able to select the area of study (i.e. geography, language, foreign language, mathematics, social studies, etc.) where the student needs the most work. As example, if the class had been studying "Russia" in social studies and the student didn't feel he had comprehended a point, the student is able to obtain a "second" (outside of the classroom) review of the subject, "Russia".

The computer system is powered by the traditional voltage system of the school bus (typically 12 or 24 volt). A single computer is created which services a variety of individual displays and input apparatus.

Ideally located at the front of the bus, the software for running the computer is selected by the driver or the accompanying teacher. The lesson is communicated to each of the individual displays/keyboards allowing the students to progress at their own rate.

In one embodiment of the invention, the software records an identification of the student doing the work; when the student returns to the bus, the software is able to begin the instruction where the student left off in their last trip.

Utilizing both audio and visual stimulation, the student is prompted and encouraged to perform to their maximum ability.

In one embodiment of the invention, the software is tailored for a specific field trip (i.e. to a museum). En-route to the museum, the students are taught the layout and items which they will see while there; En-route back to the school, the software queries/quizzes the students about what they learned. The results of this query are recorded for the teach to analyze later to see if the students obtain as meaningful of an excursion as hoped.

The invention, together with various embodiments thereof, will be more fully explained by the accompanying drawings and the following description.

DRAWINGS IN BRIEF

DRAWINGS IN DETAIL

Figure 1:
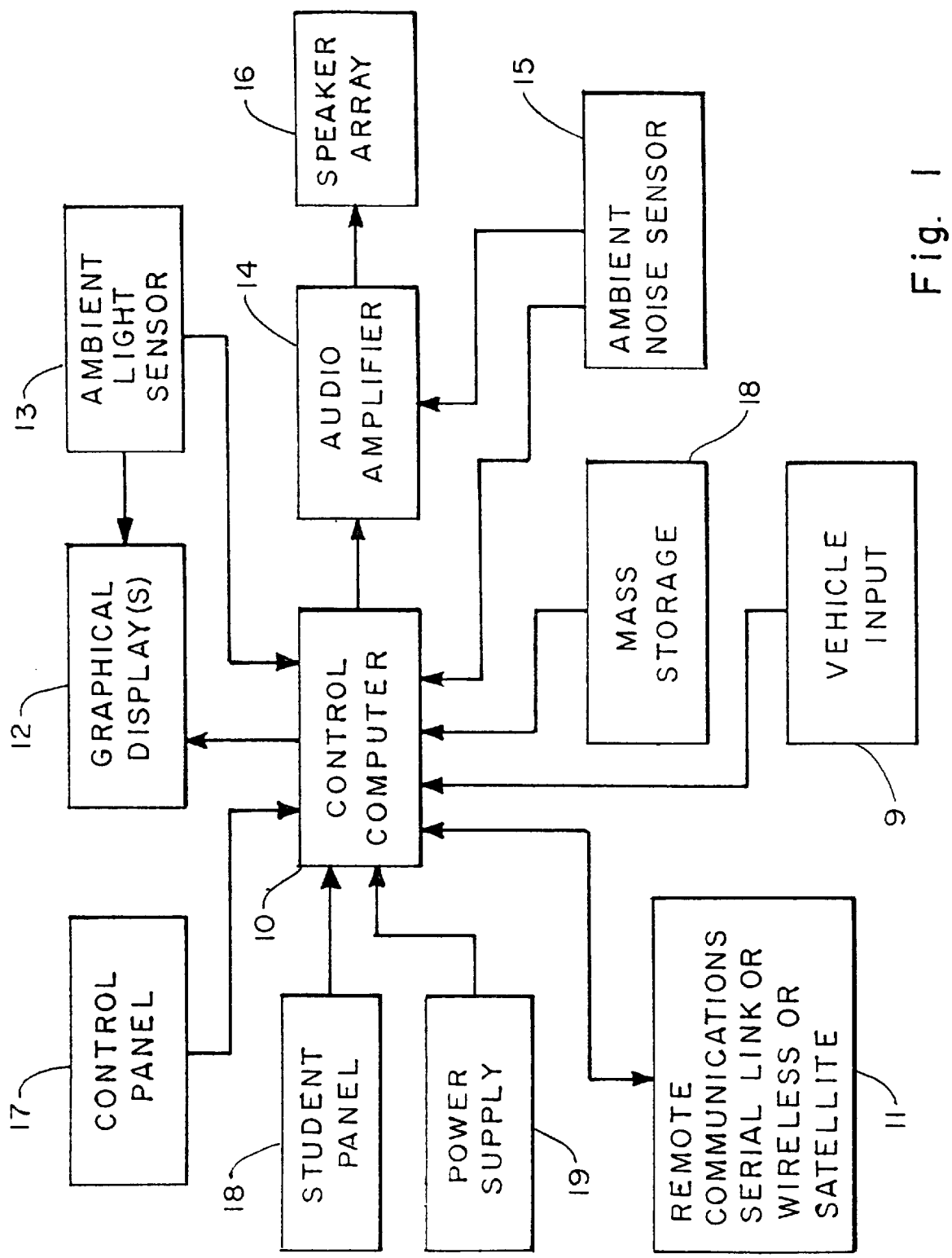
FIG. 1 is a block diagram illustrating the preferred embodiment's operational capability.

FIG. 1 is a block diagram illustrating the preferred embodiment's operational capability.

While the present discussion relates to the instruction of reading techniques, the invention is not intended to be so limited and encompasses any subject.

The Control Computer 10 controls the information display and audio system. The computer 10, under software control, sequentially displays information and associated audio in accordance with established educational practices. The sequential program is dependent on the educational target discipline.

New educational programs as well as upgraded software are loaded via the remote connection 11. Ideally computer 10 is sufficient rugged to survive the extreme's often encountered within a bus and to operate even during typical vibrations caused by the bus.

The Graphical Display 12 provides a main unit display over which educational material is displayed. In the preferred embodiment, Graphical Display 12 is a multi color graphical display utilizing any of many appropriate displays obvious to those of ordinary skill in the art.

While this embodiment utilizes a single (or a selected few) displays, other embodiments provide for individual displays controlled by the Control Computer 10.

In a large bus, multiple displays (monitors) may be required. In this embodiment, the same displayed information is presented at various locations on the bus.

As an option, an embodiment of the invention supports one display for each student. In this embodiment, the individual student display incorporates a student control panel allowing the student to make selections and provide answers. The individual displays are attached to the computer via video cable or an RF broadcasting system. Use of Radio-Frequency (RF) control is the preferred embodiment, allowing the system of this invention to be easily installed and expanded. Further, as a security measure, the individual displays could be easily removed at the end of the day and placed in a secure storage facility.

Using an Ambient Light Sensor 13, the system senses the ambient light level and provides information to the display and/or computer to increase or decrease the brightness of the main display proportional to the ambient light level.

The Audio Amplifier 14 amplifies the computer audio output to a suitable level to drive a multi speaker array. The amplification level is controlled by the computer and control panel. The audio, generated by the computer, is optionally either prerecorded narration or computer generated synthesized speech. Synthesized speech provides for a wider range of capabilities and is ideally human sounding for instructional content. Music and other audio special effects are also generated.

To assist in presenting the audio at a suitable level, an Ambient Noise Sensor 15 senses the ambient noise level of the environment and sends information to the audio amplifier 14 and/or computer 10 to automatically adjust speaker 16 volume proportional to the ambient noise. In some embodiments, there are multiple sensors each associated with a particular speaker in the speaker array 16.

The Speaker Array 16 establishes a distributed audio loudspeaker system to provide clear understandable audio to the students on the bus. The system employs multiple speakers arranged to provide clear understandable audio to the students while minimizing annoyance to the driver.

In the preferred embodiment, the driver is provided an easily accessible switch which will disable the audio. This attribute of the preferred embodiment provides additional safety for the passengers.

Using the Control Panel 17, the operator of the system (either the bus driver or an accompanying teacher) is able to start and stop the software program. The operator is also given the ability to: makes specific program selection and to control of system diagnostic tools.

Each Student Panel 18 (of which there may be many) provides the student an input device to computer 10. Ideally there is one display for each student. Student Panel 19 allows the student to make selections and provide answers.

These answers, as well as other data and programs, are stored on Mass Storage 18. Within Mass Storage 18 are: executable programs, audio/video material, software diagnostic routines, and system utilization statistic. This may be any suitable storage medium. Some examples would be Hard disk, CD-ROM, Flash memory or PCMCIA memory.

Remote Communications 11, in this embodiment, provides communications to external computer systems. This communications link provides for remote loading of software programs, audio/video programs or diagnostic program. This link can be implemented in any appropriate communications technology.

In one embodiment of the invention, the remote communications includes a Global Positioning Satellite (GPS) System allowing the system to maintain cognizance of where it actually is. This information, when tied to the program, permits the educational system of this invention to interrupt itself (or self-pace) to announce facts of interest (i.e. "On your right is the location where the first shot of the revolutionary war was said to have been fired. Can you tell me what name that shot was given?")

Using the GPS, especially on long trips, a map of the route is easily displayed and the actual location of the bus is easily communicated to the passengers.

Since the present invention is positioned into a bus environment, the Power Supply 19 must provide the necessary electrical power for the computer and associated devices. Preferably this could be in the form of a DC to AC inverter, to convert the bus electrical system to 110V AC or in the form of DC regulator to provide regulated DC power to each system device.

Vehicle Input 9 provides the computer with information about the vehicle speed and distance traveled. This information provides pacing for the educational material. This information also aids in automatic adjustment of the audio system. "Door Opens" information is used to suspend the system during student ingress/egress. This insures students can hear any instructions issued by the driver during this period.

Through this interface, as an ancillary function, the system, in one embodiment of the invention, logs a number of data items pertinent to school bus operation: maximum speed, distance traveled, number and duration of stops.

During operation of the software, the system collects and stores a wide variety of information concerning the student. This would include: the student's name, their teacher's name, as well as test and quiz results from the software.

Figure 2:
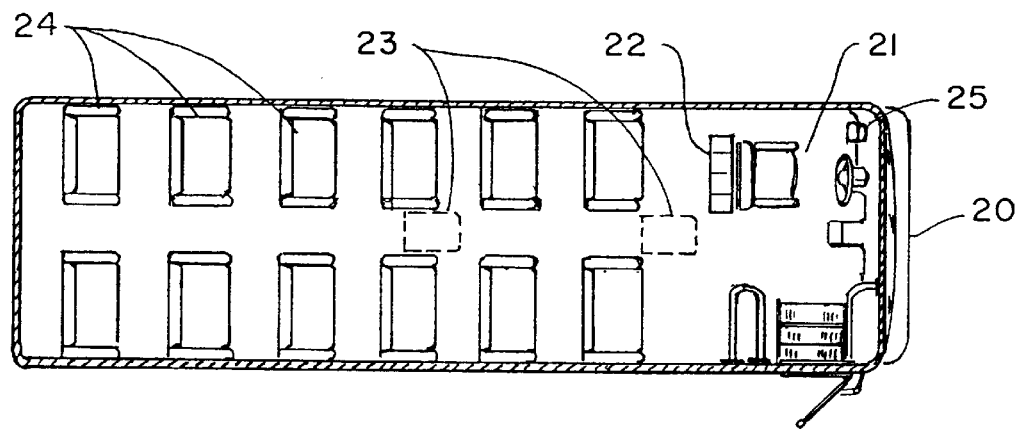
FIG. 2 is a top view of a bus illustrating the placement of the components in an embodiment of the invention.

FIG. 2 is a top view of a bus illustrating the placement of the components in an embodiment of the invention.

Bus 20 is controlled by driver 21. Behind driver 21 is located a computer rack 22 which holds the main computer as well as other ancillary devices. This computer communicates with overhead monitors 23 which are strategically placed so as to be visible from any of the seats 24.

Control panel 25 allows the driver to control the operational functions of the computer held in computer rack 22.

Note, ideally there would be no modifications to the bus except for the mounting of the overhead monitors and speakers. The system would also require access to the bus power system.

A simple control panel would be provided for the driver to start and stop the system.

Figure 3:
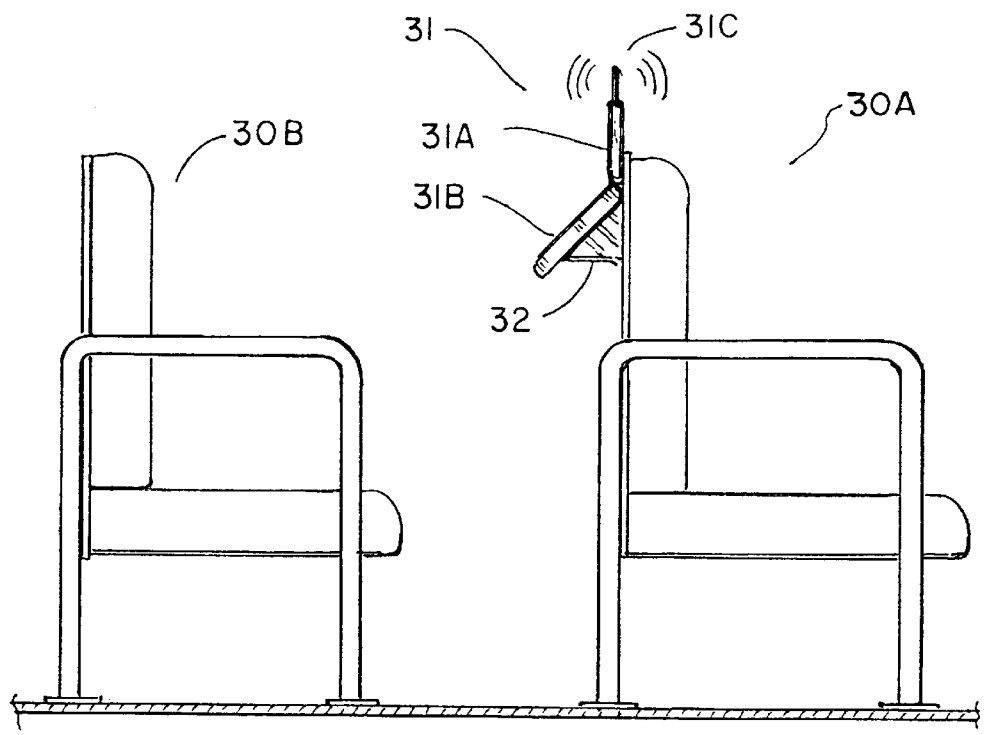
FIG. 3 is a side view of a bus seat illustrating the placement of an embodiment of the individual interface.

FIG. 3 is a side view of a bus seat illustrating the placement of an embodiment of the individual interface.

On the back of seat 30A is placed interface 31 which is accessible and visible from seat 30B. Interface 31, in the preferred embodiment a lap-top computer equipped with RF (or other wireless) sending and receiving capabilities 31C, has a monitor portion 31A and keyboard portion 31B. Incoming RF signals are communicated via monitor 31A and input from the student, via keyboard 31B, are communicated to the central computer via the RF signals.

Each interface 31 is identified by a unique identifier which is coupled with the communication so that interface 31 only responds to signals intended for it. It should be noted that this communication is bi-directional allowing both the computers to freely exchange data and information.

Figure 4:
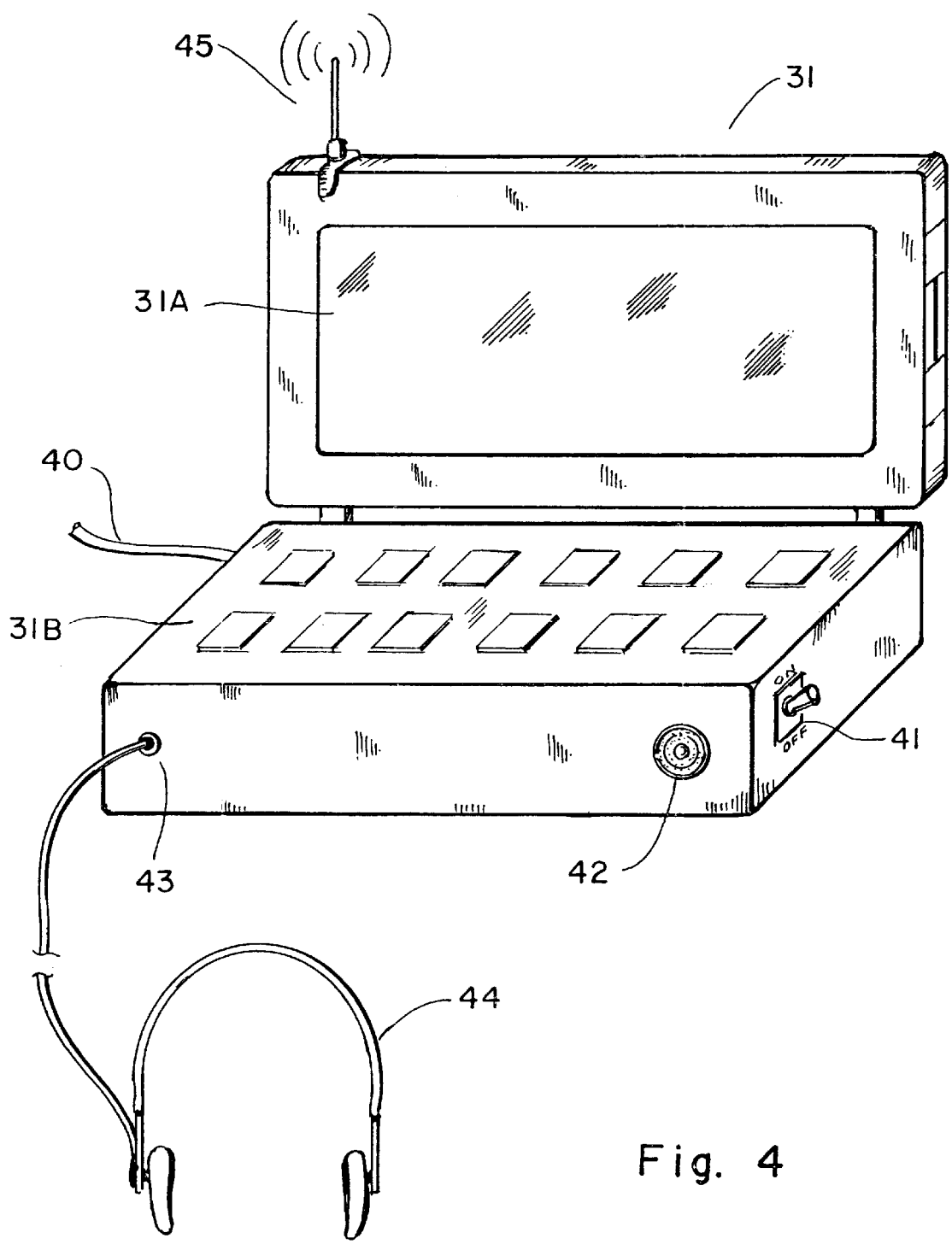
FIG. 4 is a perspective view of the interface described in general in FIG. 3.

FIG. 4 is a perspective view of the interface described in general in FIG. 3.

As described before, interface 31 has a monitor/screen portion 31A as well as keyboard 31B. Further, interface 31 is equipped with speaker 42 as well as headphones 44 which communicate via plug 43 with the internal computer (not shown).

Signals to and from interface 31 are communicated via RF transmitter/receiver 45.

External power cord 40 provides electrical power to interface 31 which is activated by on/off switch 41.

Figure 5:
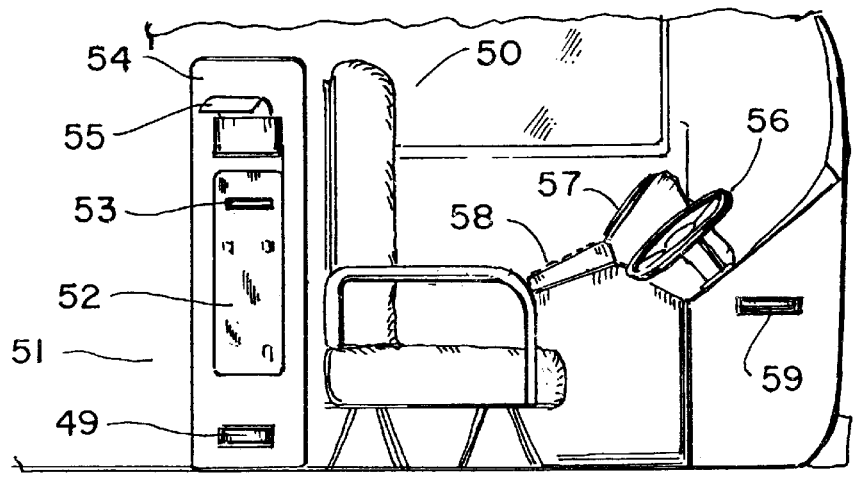
FIG. 5 is a side view of the bus driver's seat configuration for the preferred embodiment.

FIG. 5 is a side view of the bus driver's seat configuration for the preferred embodiment.

Seat 50 is positioned so that the driver has access to steering wheel 56 and keyboard 58 (located to his/her left). Keyboard 58 and display screen 57 communicate with computer 52 located in rack 51. Disc slot 53 receives a diskette for both downloading of lessons and also for storage of lesson results. Lesson results are also available from printer 54 which generates a printed report 55 which is removed and taken to the instructor for the instructor's use.

Computer 52, in some embodiments, also communicates with the engine's computer 59 to obtain diagnostic information which is collected by the bus mechanics for repairs.

In another embodiment, computer 52 communicates with a Global Positioning Satellite (GPS) 49 System and sensors located at key locations within the bus (i.e. the door, speedometer, lights) to create a log of activities and route of travel. This log is downloaded into a diskette 53 which is used for the record keeping activities of the school district.

This linkage between the engine's computer 59 and the central computer 52 is also used as an anti-theft mechanism. Unless the driver inputs the proper security code via keyboard 58, central computer 52 directs the engine's computer 59 to remain "off", thereby preventing the engine from being started.

Figure 6:
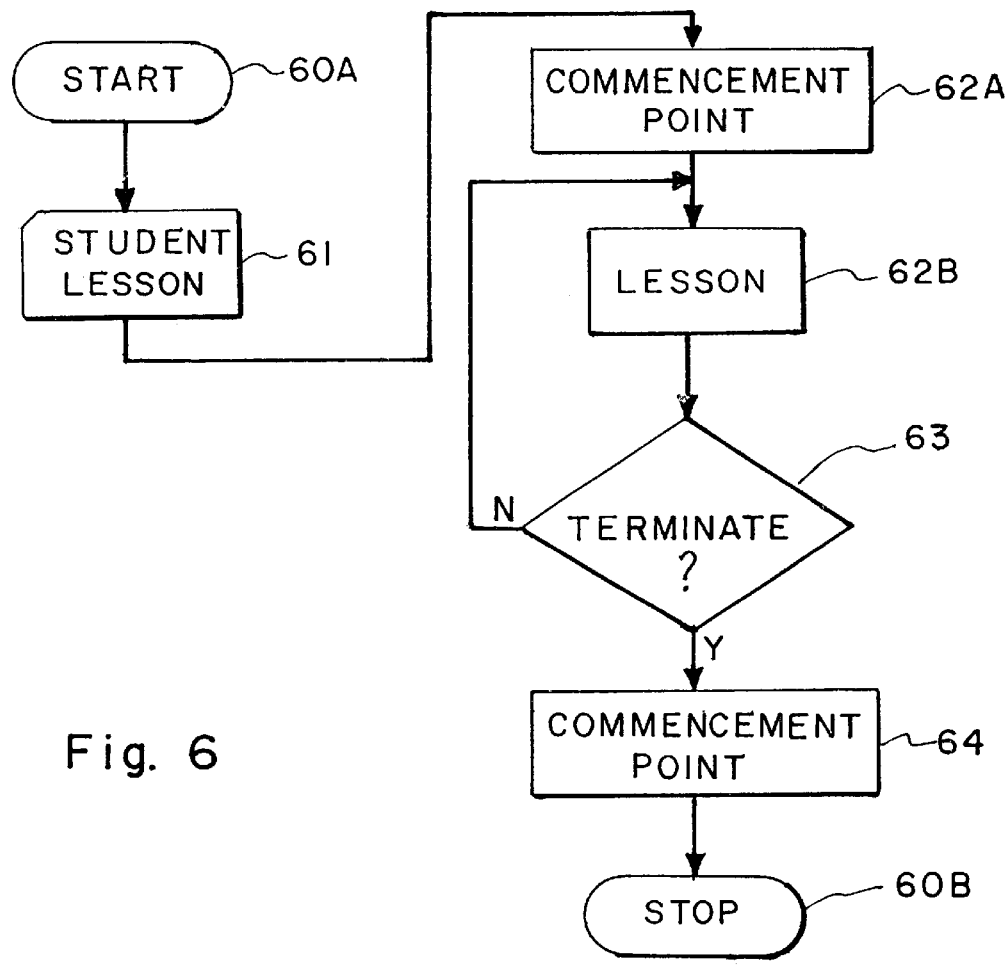
FIG. 6 is a flow chart of operations for a lesson which is performed over several iterations.

FIG. 6 is a flow chart of operations for a lesson which is performed over several iterations.

Once the start of the program 60A, the student identification and the lesson plan sought are obtained 61 from the student work station. This information is used to withdraw a commencement point 62A from memory. If the lesson being reviewed has not been studied by the student before, the commencement point is the first of the lesson.

Using the commencement point, the lesson is commenced at the appropriate point 62B and is conducted until a termination 63 is received. The point of termination is then recorded as the commencement point 64 and the program stops 60B.

This procedure allows longer lessons to be given to students as the student is able to review of part of the lesson on one trip and then continue the lesson later from the point where the first segment ends.

Figure 7:
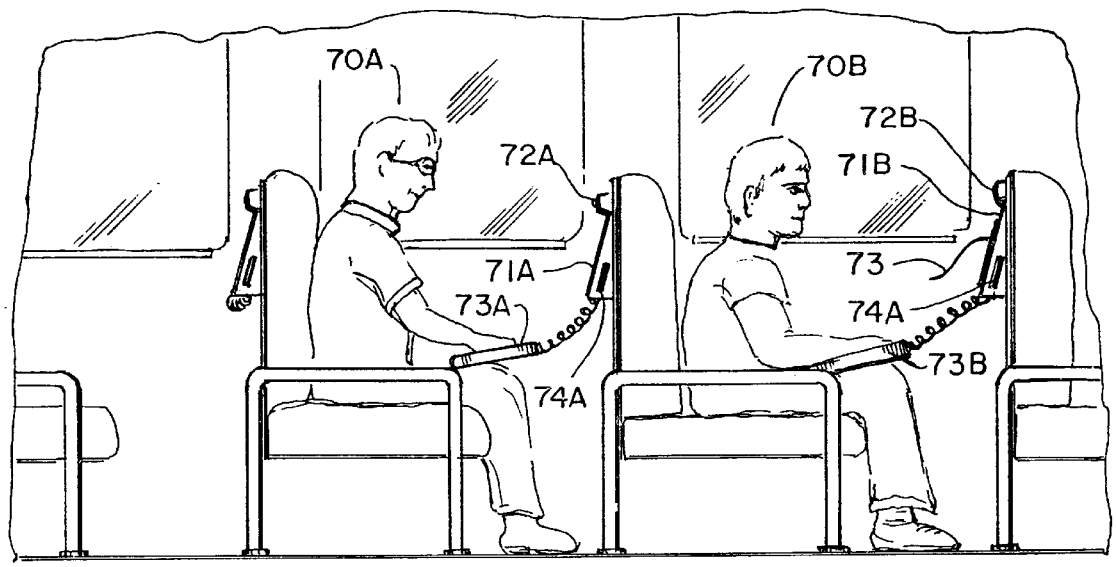
FIG. 7 is a side view of work stations of an embodiment of the invention which utilizes printers and cameras at the student work station.

FIG. 7 is a side view of work stations of an embodiment of the invention which utilizes printers and cameras at the student work station.

Passengers 70A and 70B are each interacting with their respective workstations 71A and 71B. Each workstation includes a diskette reader 74A and 74B, and a removable control panel 73A and 73B. The use of removable control panels 73A and 73B in this embodiment permit the bus driver to dispense the control panels to selected students.

Cameras 72A and 72B communicate the image of passenger 70A and 70B to the central computer (not shown) for its use. This use could be for monitoring of activity within the bus, attachment to test results, or other uses obvious to those of ordinary skill in the art.

When a passenger has completed their assignment, in this embodiment, the work station is able to print out a report 75 on the passenger/student's performance. This printout can be used for further studies or turned-in to the teacher for grading.

In one embodiment of the invention, the performance report is stored onto a diskette (within diskette readers 74A or 74B) which is submitted to the teacher for analysis.

Figure 8:
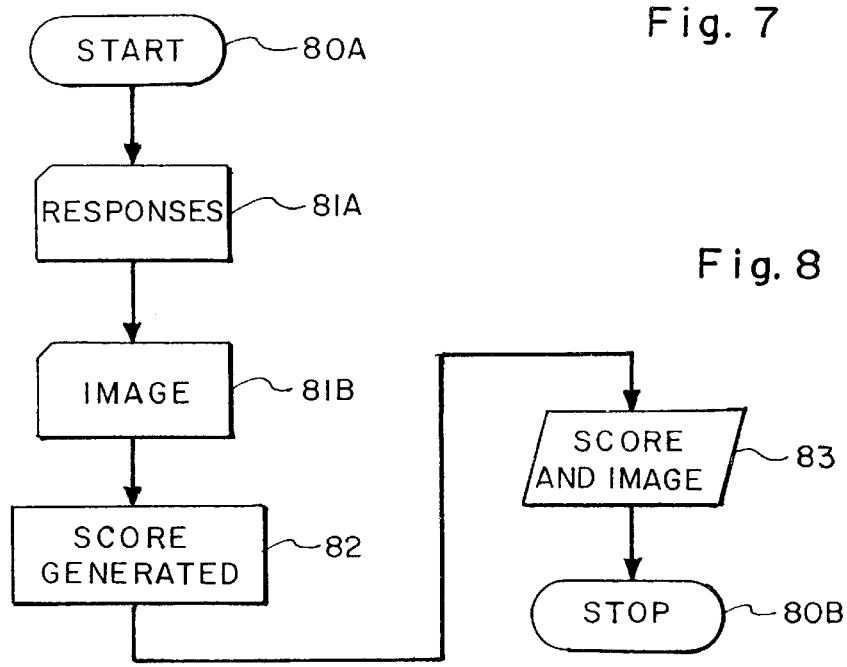
FIG. 8 is a flow chart for printing results of the lessons.

FIG. 8 is a flow chart for printing results of the lessons.

The operation outlined in FIG. 8 is employable either at the work station or at the central computer. Once the program has started 80A, the responses are gathered 81A and the image 81B of the student. The score is then generated 82.

In this embodiment, both the score and the image are printed 83 and then the program stops 80B. The printing of the score and the image allows the instructor to confirm that it was the student who did the actual work.

Figure 9:
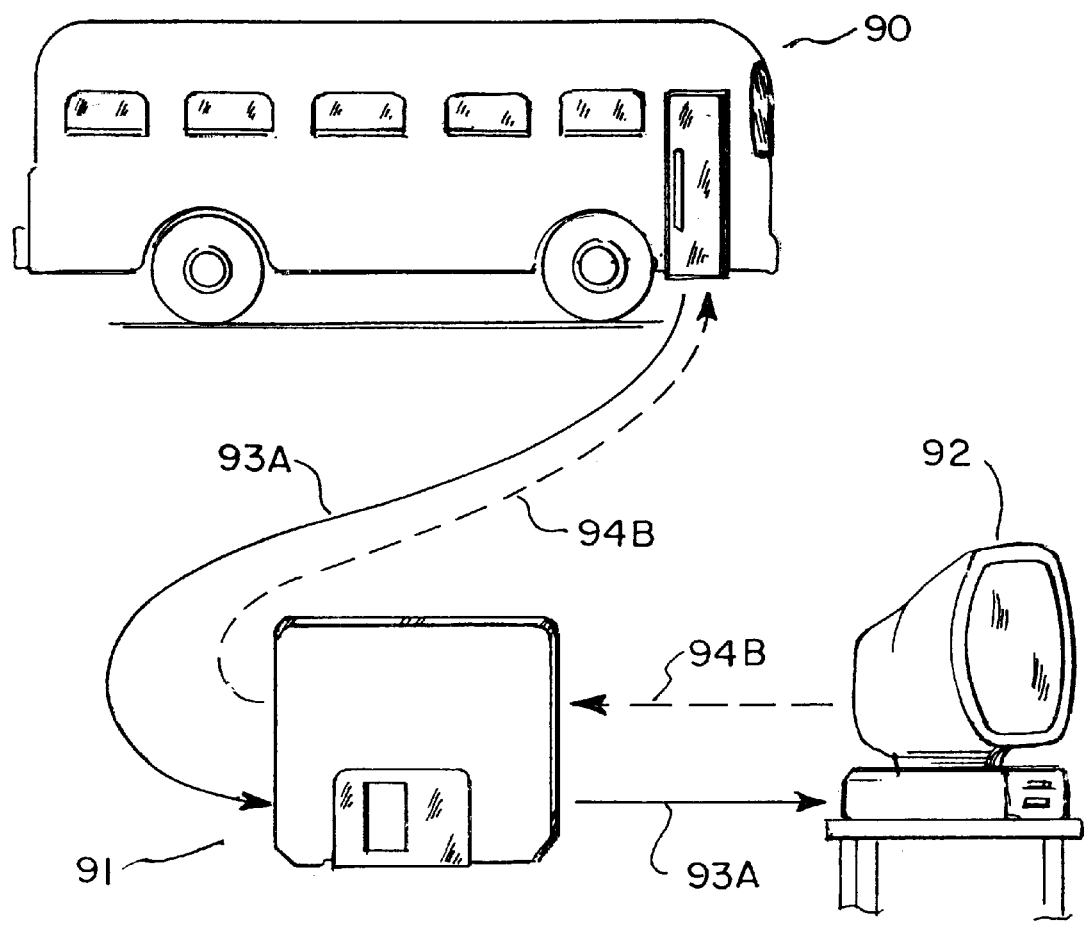
FIG. 9 is a functional layout showing the movement of results from the bus to the teacher's computer, and of lessons from the teacher's computer to the bus.

FIG. 9 is a functional layout showing the movement of results from the bus to the teacher's computer, and of lessons from the teacher's computer to the bus.

Once a student has completed a lesson on bus 90, the student removes the non-volatile memory (a diskette in this illustration, those of ordinary skill in the art readily recognize that non-volatile RAM could also be used together with other mediums) and transports it (arrow 93A and 93B) to the teachers computer 92. Usually the teacher's computer is stationary, such as within the classroom.

The teacher is able to review the student's performance.

In a reverse fashion, the teacher is able to construct lessons (or comments) on the teacher's computer 92, store the lesson onto diskette, and then have the diskette transported (arrows 94A and 94B) to the bus 90, for the student's benefit.

While this embodiment shows the use of a diskette for the transfer of information between the bus and the teacher's computer, in another embodiment, the teacher's computer and the computer on the bus are linked by "hard wire" or direct connection. This embodiment permits a more rapid and secure transfer of information between the two computers.

It is clear that the present invention creates a highly advantageous educational system which taps a heretofore wasted portion of the student's day.

What is claimed is:

1. A learning aid comprising:

a) a bus having a multitude of passenger seats;

b) a central computer system having memory means for storage of lessons requiring interaction with a student; and, c) at least two work stations, each work station associated with an individual passenger seat, each work station having:

1) a display unit, 2) an input apparatus, and, 3) a local computer, said local computer in communications with said central computer, said local computer having means for effecting interactive learning through:

A) receiving unique operational instructions from said central computer relating to a selected one of said lessons, B) communicating passenger input from said input apparatus to said central computer, and, C) communicating messages received from said central computer to a passenger via said display unit.

2. The learning aid according to claim 1, wherein said central computer further includes an operator activation means for commencing said lessons.

3. The learning aid according to claim 2, wherein said central computer includes:

a) means for recording a task location for an identified student within said memory means; and, b) means for commencing a task at a selected point based upon data identifying a student and a task location associated with said student from said memory means.

4. The learning aid according to claim 3, wherein each of said work stations includes:

a) an audio communication apparatus; and, b) means for causing said audio communication apparatus to emit sounds.

5. The learning aid according to claim 2, a) wherein said central computer includes, 1) means for transmitting said lessons via radio frequency, and, 2) means for receiving data from said work stations via radio frequency; and, b) wherein each of said work stations includes, 1) means for receiving lessons from said central computer via radio frequency, and, 2) means for transmitting data to the central computer via radio frequency.

6. The learning aid according to claim 2, a) wherein each of said work stations includes, 1) a camera generating an image of an associated individual passenger seat, and, 2) means for communicating said image to said central computer; and, b) wherein said central computer includes display means for selectively displaying images from each camera.

7. The learning aid according to claim 6, wherein said central computer includes means for storing a selected image in said memory means.

8. The learning aid according to claim 2, a) wherein said central computer includes means for generating a lesson report for each work station; and, b) wherein each of the work stations includes, 1) means for receiving the lesson report from said central computer for the specific work station, 2) a printer; and, 3) means for causing said printer to print said lesson report.

9. The learning aid according to claim 8, wherein each work station includes:

a) a removable non-volatile memory; and, b) means for storing said lesson report in said removable non-volatile memory.

10. The learning aid according to claim 2, wherein said central computer includes:

a) means for generating a lesson report for each work station; and, b) a printer; and, c) means for causing said printer to print said lesson report.

11. The learning aid according to claim 10, wherein said central computer includes:

a) a removable non-volatile memory; and, b) means for storing said lesson report in said removable non-volatile memory.

12. A learning system comprising:

a) a transport having a multitude of passenger seats; and, b) a distributed computer system powered by said transport, said distributed computer system having, 1) a central computer system containing student-interactive lessons, and, 2) at least two student work stations having a display unit, an input apparatus, and, a local computer, said local computer having means for effecting interactive learning through:

A) receiving unique operational instructions from said central computer relating to a selected one of said lessons, B) communicating passenger input from said input apparatus to said central computer, and, C) communicating messages received from said central computer to a passenger via said display unit.

13. The learning system according to claim 12, wherein said central computer includes:

a) means for associating a task location with an identified student; and, b) means for commencing a task at said task location.

14. The learning system according to claim 12, wherein all communications between said central computer and the student work stations is accomplished via radio frequency.

15. The learning system according to claim 12, wherein each of said student work stations includes:

a) a camera generating an image; and, b) means for communicating said image to said central computer.

16. The learning system according to claim 15, wherein said central computer includes means for generating a lesson report for each work station together with an image from said work station.

17. A teaching assembly comprising:
a) a bus having,
1) a multitude of passenger seats,
2) a central computer system having memory means for storage of lessons requiring interaction with a student; and,
3) at least two student stations having:
A) a display unit,
B) an input apparatus, and,
C) a local computer having means for effecting interactive learning through:
1) receiving unique operational instructions from said central computer relating to a selected one of said lessons,
2) communicating student input from said input apparatus to said central computer, and,
3) communicating messages received from said central computer to a passenger via said display unit; and,
wherein said central computer includes means for storing a lesson report onto a removable non-volatile memory; and,
b) a stationary teacher computer having,
1) means for receiving said removable non-volatile memory and withdrawing said lesson report therefrom, and,
2) means for communicating said lesson report to a teacher.

18. The teaching assembly according to claim 17, wherein all communications between the central computer and the student stations are accomplished using radio frequencies.

* * * * *